United States Patent [19]

Schläfer et al.

[11] Patent Number: 4,762,916
[45] Date of Patent: Aug. 9, 1988

[54] WATER-SOLUBLE DIS-, TRIS- AND TETRA-AZO COMPOUNDS CONTAINING FIBER-REACTIVE CHLORO-AND FLURO-TRIAZINYL GROUPS AND VINYLSULFONE GROUPS OR DERIVATIVES THEREOF, SUITABLE AS DYESTUFFS

[75] Inventors: Ludwig Schläfer, Kelkheim; Hartmut Springer, Königstein/Taunus; Michael Kunze, Hofheim, all of Fed. Rep. of Germany

[73] Assignee: Hoechst Aktiengesellschaft, Frankfurt am Main, Fed. Rep. of Germany

[21] Appl. No.: 945,491

[22] Filed: Dec. 23, 1986

[30] Foreign Application Priority Data

Dec. 28, 1985 [DE] Fed. Rep. of Germany ....... 3546262
Feb. 17, 1986 [DE] Fed. Rep. of Germany ....... 3604858

[51] Int. Cl.[4] .................. C09B 62/09; C09B 62/513; D06P 1/382; D06P 1/384
[52] U.S. Cl. .................................. 534/631; 534/565; 534/582; 534/598; 534/617; 534/634; 534/636; 534/637; 534/638; 534/642
[58] Field of Search ............ 534/634; 8/549; 11/637; 534/631

[56] References Cited

U.S. PATENT DOCUMENTS 3,647,778 3/1972 Andrew et al. ............... 534/634
4,066,389 1/1978 Riat et al. ..................... 534/634 X
4,323,497 4/1982 Hoyer et al. .................. 534/634
4,622,390 11/1986 Meininger et al. ............. 534/634

FOREIGN PATENT DOCUMENTS 2835035 10/1980 Fed. Rep. of Germany ...... 534/634
60-72960 4/1985 Japan ................................ 534/634
60-215882 10/1985 Japan ............................. 534/634
2008144 5/1979 United Kingdom .
2008145 5/1979 United Kingdom .

Primary Examiner—Floyd D. Higel

[57] ABSTRACT

Water-soluble compounds having fiber-reactive dye properties of the general formula

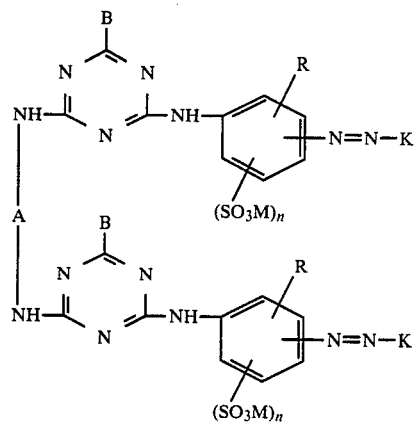

in which
A is an alkylene of 2 to 6 carbon atoms or a phenylene which can be substituted by 1 or 2 substituents, or is a radical of the formula

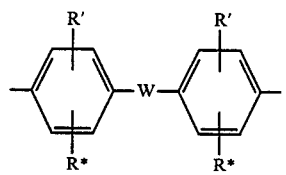

in which
W is a direct bond or a bridge member and the R' and R* each denote hydrogen, chlorine, methyl, methoxy, ethoxy, carboxy or sulfo;
B is chlorine or fluorine;
R is hydrogen, chlorine, an alkyl of 1 to 4 carbon atoms or an alkoxy of 1 to 4 carbon atoms;
M is hydrogen or an alkali metal;
n stands for the number zero, 1 or 2,
K is a radical of the formula

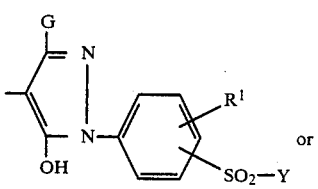

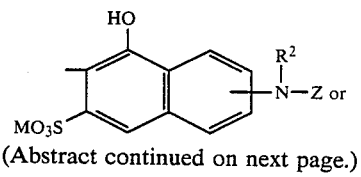

(Abstract continued on next page.)

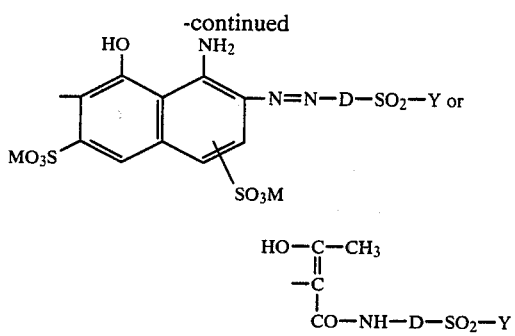

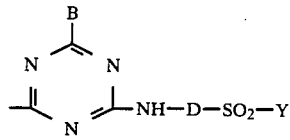

in which
D is phenylene which can be substituted by chlorine, bromine, alkyl of 1 to 4 carbon atoms, alkoxy of 1 to 4 carbon atoms, carboxy or sulfo, or is naphthalene with optionally 1 or 2 sulfo groups,
$R^1$ denotes hydrogen, chlorine, alkyl of 1 to 4 carbon atoms or alkoxy of 1 to 4 carbon atoms,
$R^2$ is hydrogen or alkyl of 1 to 4 carbon atoms,
G is carboxy, methyl or carbalkoxy of 2 to 5 carbon atoms,
Y denotes vinyl, β-sulfatoethyl, β-phosphatoethyl, β-thiosulfatoethyl or β-chloroethyl,
Z is the α- or β-bromoacryloyl or β-chloropropionyl or a radical of the formula $$\underset{N}{\overset{B}{\underset{\|}{\underset{N}{\bigwedge}}}}\text{—NH—D—SO}_2\text{—Y}$$

with B, D and Y of the abovementioned meanings.

The novel dyes are suitable for dyeing hydroxyl- and/or carbamoyl-containing material; on hydroxyl-containing material, such as cellulose fibers, they become fixed not only in the alkaline but also in the weakly acid to neutral range, so that they can be used together with disperse dyes for dyeing blend material composed of cellullose and polyester fibers by the dyeing methods for disperse dyes.

17 Claims, No Drawings

WATER-SOLUBLE DIS-, TRIS- AND TETRA-AZO COMPOUNDS CONTAINING FIBER-REACTIVE CHLORO-AND FLURO-TRIAZINYL GROUPS AND VINYLSULFONE GROUPS OR DERIVATIVES THEREOF, SUITABLE AS DYESTUFFS

The present invention relates to the technical field of textile dyes.

Cellulose fibers and polyester fibers, owing to their different chemical natures, cannot at present both be dyed in a uniform and even manner with one and the same dye. It is instead necessary to dye materials which represent mixtures of these two kinds of fiber, such as, for example, blend fabrics, in a two-stage process, namely first by dyeing the one kind of fiber with a dye suitable for it and then the other kind of fiber with a dye suitable for this second kind of fiber, using different process conditions in each case. Such a procedure is of necessity laborious and in need of replacement. Another way of dyeing such blended fiber materials relies on the use of dye mixtures, for instance a mixture of a fiber-reactive dye for dyeing the cellulose fiber portion and a disperse dye for dyeing the polyester fiber portion. Since fiber-reactive dyes are customarily fixed on the cellulose fiber in an alkaline medium and disperse dyes, like to some extent the polyester fiber also, are customarily sensitive to alkali, this procedure has the disadvantage that fixing the fiber-reactive dyes in an alkaline medium can damage the disperse dyes present at the same time and also the polyester fiber.

It is thus an object of the present invention to reduce or even to eliminate these previously known disadvantages, in particular since the dyeing of blend fabrics, such as, for example, those composed of cellulose and polyester fibers, is becoming increasingly important. There thus also exists an increased interest in dyes which facilitate the dyeing of such blend fabrics, in particular in fiber-reactive dyes which are capable of being fixed on the cellulose fiber in the non-alkaline range and can in addition be applied at very low dyeing temperatures.

For instance, U.S. Pat. No. 3,647,778 describes disazo dyes which contain two chloro-s-triazinylamino radicals which are linked with each other via a bridge member and to which is bonded in the terminal position, again via an amino group, a sulfo-containing naphthylazonaphthalene or phenylazonaphthalene chromophore. These fiber-reactive dyes can be used to dye cellulose fiber materials, the dyes being applied and fixed by the dyeing methods customary for fiber-reactive dyes by means of acid-binding, i.e. alkaline, agents. However, these known dyes are not fixed to a high fastness level to the cellulose fiber in the weakly acid to neutral dyeing range.

Disazo dyes of similar structure are known from U.S. Pat. No. 4,323,497; they additionally contain a fiber-reactive group of the vinylsulfonyl series within the diazo component of the azo chromophore. These dyes are likewise not suitable for the dyeing to a high fastness level of cellulose fiber materials in the weakly acid to weakly alkaline range.

The present invention now provides novel water-soluble compounds which conform to the general formula (1) mentioned and defined hereinafter, which have fiber-reactive properties and which can not only be used with advantage for dyeing cellulose fibers in the alkaline range but, surprisingly, are also capable of becoming fixed on cellulose fibers even in a weakly acid and neutral range, namely under the conditions of the so-called high-temperature neutral dyeing process (HTN process) at temperatures between 100° and 150° C. and at a pH value between 4 and 8 in an aqueous medium, and thus under the conditions of dyeing polyester fibers. By providing the novel dyes of the general formula (1) it becomes possible to use the hitherto customary and traditional disperse dyes together with these novel dyes in single-stage dyeing processes for dyeing cellulose/polyester fiber blends whereby the two fiber-components are dyed uniformly and to a high fastness level by the respective type of dye and tone in tone dyeing can be obtained if the disperse dye used has the same shade as the fiber-reactive dye.

The novel fiber-reactive compounds have the general formula (1)

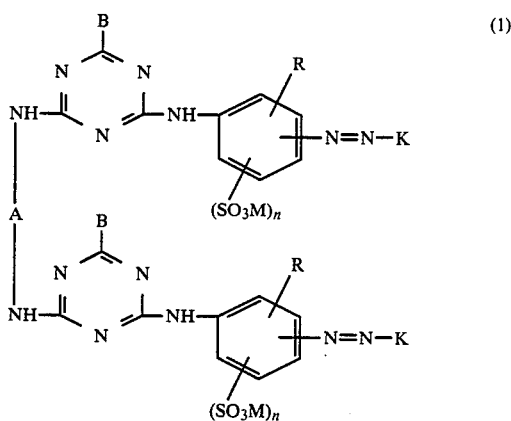

in which the various formula members have the following meanings:

A is a straight-chain or branched, preferably straight-chain, alkylene group of 2 to 6 carbon atoms or a phenylene radical which can be substituted by one or two substituents, such as, for example, by one or two substituents from the group alkoxy of 1 to 4 carbon atoms, such as methoxy and ethoxy, alkyl of 1 to 4 carbon atoms, such as methyl and ethyl, chlorine, sulfo and carboxy, in particular the sulfo groups being preferred substituents, or A is a radical of the general formula (2)

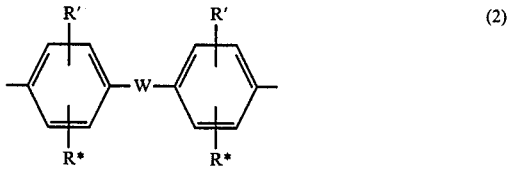

in which

W is a direct bond or a bridge member, such as, for example, a group of the formula —CH$_2$—, —CH$_2$—CH$_2$—, —O—CH$_2$—CH$_2$—O—, —CH=CH—, —N=N—, —NH—CO—NH— or —CO—NH—, the groups —CH=CH— and —NH—CO—NH— being preferred and W similarly preferably denoting a direct bond, and the R' and R*, identical to or different from each other, the R* preferably identical to each other, each denote a hydrogen atom, a chlorine atom or a methyl, methoxy, ethoxy, carboxy or sulfo group, the R' preferably being a hydrogen atom;

B is a chlorine or a fluorine atom, preferably a chlorine atom;

R is a hydrogen or a chlorine atom, an alkyl group of 1 to 4 carbon atoms, such as the methyl group, or an alkoxy group of 1 to 4 carbon atoms, such as methoxy or ethoxy group, preferably a hydrogen atom;

M is a hydrogen atom or an alkali metal, such as sodium, potassium or lithium;

n stands for the number zero, 1 or 2 (where in the case of n=0 this group denotes a hydrogen atom), and is preferably zero or 1 in the case where R is one of the groups mentioned other than hydrogen;

K is a radical of the general formula (3), (4), (5) or (6)

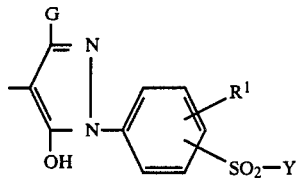
(3)

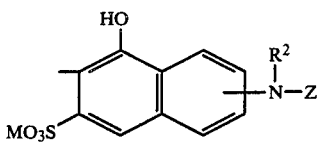
(4)

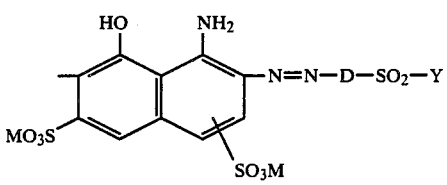
(5)

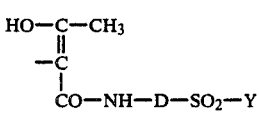
(6)

in which the meanings are:

D is a phenylene radical which can be substituted by 1 or 2 substituents from the group chlorine, bromine, alkyl of 1 to 4 carbon atoms, such as methyl, alkoxy of 1 to 4 carbon atoms, such as methoxy and ethoxy, carboxy and sulfo, or is a naphthalene radical, such as in particular a naphthalene radical which is bonded to the azo group in the 2-position and which can be substituted by 1 or 2 sulfo groups;

$R^1$ is a hydrogen atom, a chlorine atom, an alkyl group of 1 to 4 carbon atoms, such as the methyl group, or an alkoxy group of 1 to 4 carbon atoms, such as the methoxy group, preferably a hydrogen atom;

$R^2$ is a hydrogen atom or an alkyl group of 1 to 4 carbon atoms such as the methyl group;

G is a carboxy, methyl or carbalkoxy group of 2 to 5 carbon atoms, such as the carbomethoxy or carbethoxy group, preferably the methyl or carboxy group;

Y is a vinyl, β-sulfatoethyl, β-phosphatoethyl, β-thiosulfatoethyl or β-chloroethyl group, preferably the vinyl and in particular the β-sulfatoethyl group;

M has the abovementioned meaning;

Z is the α- or β-bromoacryloyl radical, but preferably the β-chloropropionyl radical or a radical of the general formula (3a)

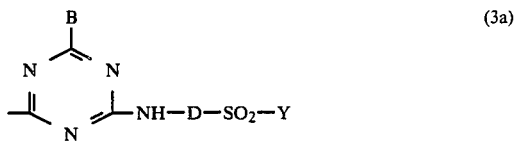
(3a)

in which B, D and Y have the abovementioned, in particular the preferred, meanings.

The individual formula members can be identical to or different from each other. In particular the formula members which each appear twice can be identical to or different from each other; preferably the formula radical pair B, R, M and K are each identical to each other.

In the general formulae (3a), (5) and (6), D is preferably an unsubstituted phenylene radical or a phenylene radical which is substituted by one of the substituents mentioned. The fiber-reactive groups of the formula —SO₂—Y is preferably bonded in the general formulae (3), (3a), (5) and (6) to the benzene nucleus in the meta- or para-position relative to the nitrogen atom of the pyrazolone or relative to the amino, azo or amide group.

Heretofore and hereinafter, sulfo groups denote groups conforming to the general formula —SO₃M with M of the abovementioned meaning, and furthermore carboxy groups denote groups of the general formula —COOM, phosphato groups denote groups of the general formula —OPO₃M₂, thiosulfato groups denote groups of the general formula —S—SO₃M and sulfato groups denote groups of the general formula —OSO₃M, each with M of the abovementioned meaning.

The azo compounds according to the invention can be present in the form of the free acid thereof and preferably in the form of the alkali metal salts thereof, in particular the neutral salts. They are preferably used in the form of these salts for dyeing and printing hydroxy- and/or carboxamide-containing fiber materials.

The present invention further provides processes for preparing the azo compounds of the general formula (1). In these processes, (a) an aromatic amino compound of the general formula (7)

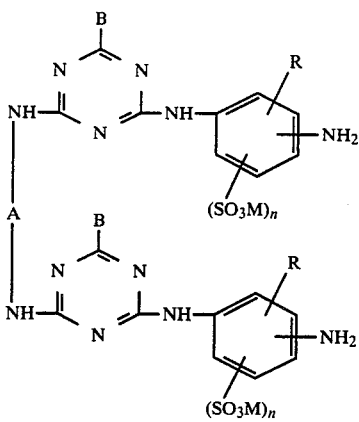 (7)

in which A, B, R, M and n have the abovementioned meanings, is doubly diazotized (tetrazotized) in a conventional manner and coupled in a conventional manner to a coupling component of the general formula (8)

H—K     (8)

in which K has the abovementioned meaning, or to two different coupling components of the general formula (8) in an equivalent amount, or (b) an aromatic dihalogenotriazine-azo compound of the general formula (9)

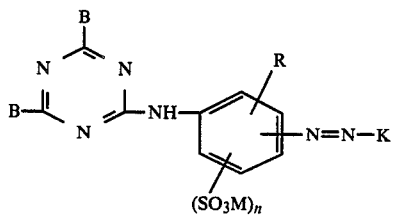 (9)

in which B, R, K, M and n have the abovementioned meanings and the two formula members B are identical to each other, or two different compounds of the general formula (9) are reacted in an equivalent amount with a diamino compound of the general formula (10)

H$_2$N—A—NH$_2$     (10)

in a conventional manner of reacting amino compounds with dihalogenotriazine compounds.

The starting compounds of the general formula (9) can be prepared in a known manner by reacting an amino-azo compound of the general formula (11)

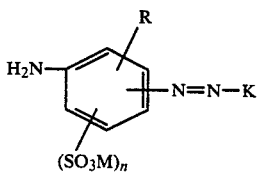 (11)

in which R, K, M and n have the abovementioned meaning, with cyanuric chloride or cyanuric fluoride, or by diazotizing a dihalogenotriazine compound of the general formula (12)

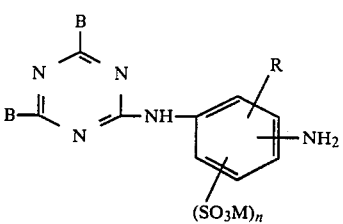 (12)

in which B, R, M and n have the abovementioned meaning, and coupling to a compound of general formula (8).

The compounds of the general formula (7) or (12) are diazotized in a conventional manner, for example by reaction with nitrous acid in an aqueous-acid medium, for instance at a temperature between −5° C. and +10° C. and at a pH value between 0 and 2. The coupling reactions can likewise be carried out in an aqueous medium, for example at a temperature between −5° C. and +30° C. and at a pH value between 3 and 8, preferably 3 and 7.

The condensation reaction between the dihalogenotriazinyl-azo compound of the general formula (9) and the diamino compound of the general formula (10) is effected in a conventional manner as described in the literature for this type of reaction, for example in an aqueous or aqueous-organic medium (the organic component preferably being acetone, toluene and ethylene chloride), at a pH value between 2 and 6 and at a temperature between 20° and 60° C. The starting compounds which serve to prepare the compounds according to the invention are extensively described in the literature or can be prepared analogously to the compounds described in the literature from their corresponding analogous precursors. For instance, the starting amino compounds of the general formulae (7) and (12) can be easily built up by the methods described in German Pat. No. 485,185.

The compounds of the general formula (1) prepared according to the invention can be separated and isolated from the synthesis solutions by commonly known methods, for example by precipitating from the reaction medium with the electrolytes or by evaporating the reaction solution, for example by spray-drying, if desired after buffer substances have been previously added to the synthesis solution.

The compounds according to the invention have dye properties. Owing to the fiber-reactive groups which they possess, they can also be used as fiber-reactive dyes. They can be used in conventional and known methods of applying and fixing fiber-reactive dyes to hydroxy-containing or carboxamide-containing materials, in particular fiber materials, for dyeing (including printing), for example on wool, synthetic polyamide fibers, but in particular cellulose fiber materials, such as cotton. Such methods are extensively described in the trade literature as well as the patent literature, for example in German Offenlegungsschrift No. 3,440,265.

The present invention thus also provides the use of the compounds according to the invention for dyeing (including printing) hydroxy-containing and/or carboxamide-containing materials, in particular fiber materials, or rather a process for dyeing (including printing) such materials by applying a compound according to the invention to the material from a preferably aqueous solution and fixing it on the material by means of heat and/or with the aid of an acid-binding agent—in the case of dyeing of hydroxy-containing materials preferably at a pH value between 8 and 11 and at a temperature between 15° and 120° C., preferably between 20° and 80° C.

The compounds according to the invention additionally have the great advantage, as already mentioned in the beginning, that they are capable of dyeing hydroxy-containing fiber materials, such as cellulose fiber materials, from an aqueous liquor, such as preferably in an aqueous dyebath by an exhaust process, even in a weakly acid pH range from 5 to greater than 5, such as at a pH value between 5 and 7, i.e. surprisingly in the absence of alkaline substances, but if desired in the presence of a customary acid-binding buffer mixture for setting and maintaining the pH range, and if desired in the presence of customary dyeing assistants, at a temperature between 100° and 150° C., preferably at a temperature of 120° to 135° C., and of becoming fixed on these materials to a high fastness level. The buffers are for example aqueous solutions of phosphoric acid/sodium phosphate and acetic acid/sodium acetate.

Under these dyeing conditions of the high-temperature neutral dyeing methods, which are known per se (see German Auslegeschrift No. 2,835,035) and which essentially correspond to the dyeing conditions of dyeing polyester fibers or other synthetic fibers, such as cellulose triacetate fibers, with disperse dyes, it is possible to dye cellulose blend fiber materials, such as cellulose/cellulose triacetate fiber and cellulose/polyacrylic fiber and in particular cellulose/polyester blend fiber materials, with a customary disperse dye at the same time and together with a fiber-reactive dye, namely an azo compound according to the invention, from a common aqueous dyeing liquor without the otherwise existing danger of damaging the disperse dye or the synthetic fiber, such as the polyester fiber, with advantage in a single-stage process with uniform results to a high fastness level and if desired tone in tone.

The present invention thus also provides a process for dyeing blend fiber materials composed of cellulose and synthetic fibers, preferably cellulose/polyester fiber blends, with one (or more) disperse dyes and one or more dyes according to the invention by applying these dyes to the fiber material from an aqueous dyeing liquor, preferably from an aqueous dye bath, at a temperature between 100° and 150° C., preferably at a temperature of 120° to 135° C., and at a pH value between 4 and 8, if necessary between 5 and 7.5, preferably between 5 and 7.

This dyeing method according to the invention dyes the synthetic fibers such as polyester fibers, with the disperse dye and the cellulose fibers with the fiber-reactive azo compound according to the invention in the desired high quality (the azo compound according to the invention does not stain the synthetic fiber, be it cellulose triacetate or polyester fiber). The quality of the dyeing of the synthetic fibers is dependent upon the disperse dye and corresponds to the state of the art. Surprisingly the cellulose fiber materials which have been dyed with the azo compound according to the invention under these disperse dyeing conditions have, in addition to a bright shade, considerable fastness properties (these fastness properties are present whenever the azo compounds according to the invention are applied to the cellulose fiber materials by the customary methods of applying and fixing fiber-reactive dyes in the alkaline range).

Worthy of singling out among the good end-use and manufacturing fastness properties are in particular the good light fastness properties of the cellulose dyeing not only when dry but also when moist after impregnation with tap water or an alkaline perspiration solution, and further among the wet fastness properties in particular the good wash, water, seawater, cross-dyeing and perspiration fastness properties and the good acid-fading resistance and in particular the good pleating, hot press, crock and sublimation fastness properties of dyeings on cellulose fiber materials which are obtainable with the azo compounds according to the invention not only through applying the methods for fiber-reactive dyes but also through applying the dyeing methods for disperse dyes.

The Examples below serve to illustrate the invention. The parts and percentages are by weight, unless otherwise stated. Parts by weight relate to parts by volume as the kilogram relates to the liter. The compounds described in the Examples by means of formulae are written in the form of the free acids; in general they are prepared and isolated in the form of their alkali metal salts and used for dyeing in the form of these salts. Similarly the starting compounds and components mentioned in the Examples, in particular tabulated Examples, in the form of the free acids can be used in the synthesis as such or in the form of their salts, preferably alkali metal salts, such as sodium or potassium salts.

The absorption maxima ($\lambda_{max}$ value) in the visible region mentioned in the Examples for the azo compounds according to the invention were determined on aqueous solutions of their alkali metal salts.

EXAMPLE 1

A solution prepared from 37 parts of 4,4'-diaminostilbene-2,2'-disulfonic acid, 17 parts by volume of a 32% strength aqueous sodium hydroxide solution and 700 parts of water is added with thorough stirring in the course of 15 minutes to a mixture of 400 parts of ice, 100 parts of water and 37 parts of cyanuric chloride; about 1 part of a commercially available dispersant is added, the pH of the reaction mixture is brought with sodium bicarbonate to a value of 5.8, and the reaction mixture is subsequently stirred at 10° C. for 1 hour while the pH range from 4.5 to 5.5 is maintained. A solution of 37.7 parts of 1,3-diaminobenzene-4-sulfonic acid, 27 parts by volume of aqueous 32% strength sodium hydroxide solution and 300 parts of water are then added, the pH value is brought to 4–5 and the temperature is raised to 40° C., and the solution which now forms is subsequently stirred at 40° to 50° C. for a further 3 hours while the pH value of 4 to 5 is maintained by means of about 40 parts of sodium bicarbonate.

The batch then has added to it 45 parts by volume of an aqueous 31% strength hydrochloric acid, is cooled down to 0° to 5° C. and, by adding 17.8 parts by volume of a 39% strength aqueous sodium nitrite solution, is diazotized in conventional manner. The coupling reaction is effected by adding an aqueous neutral solution of 47.5 parts of 3-methyl-1-(4'-β-sulfatoethylsulfonyl)-phenyl-5-pyrazolone while setting and maintaining a pH value of 6.5 to 7 by means of about 60 parts of sodium bicarbonate and 120 parts of sodium carbonate. After the coupling reaction has ended, the synthesis solution is diluted with water to 4500 parts, and 450 parts of potassium chloride are added, the mixture is heated to 80° C. and is subsequently stirred at that temperature for about 30 minutes, and the precipitated compound according to the invention is filtered off with suction at 60° to 70° C.

This gives a yellow, electrolyte-containing powder of the alkali metal salt (in particular potassium salt) of the compound of the formula

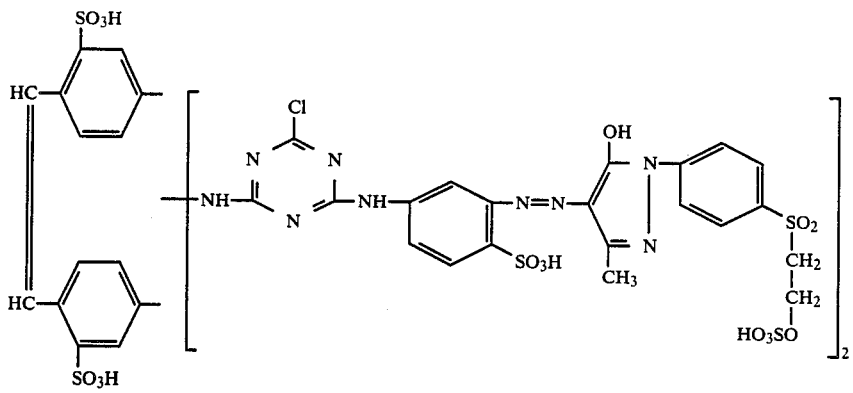

($\lambda_{max}$ = 352 nm).

The disazo compound according to the invention has very good fiber-reactive dye properties; it dyes cellulose fiber materials under the application and fixing conditions customary for fiber-reactive dyes in the presence of alkaline agents in deep and greenish yellow shades having high color yields and a high fastness level. Furthermore, on dyeing cotton from a long aqueous liquor under the dyeing conditions of polyester fiber dyeing, such as, for example, at a temperature between 120° and 130° C. in the course of a dyeing time of 90 minutes and at a pH value between 5 and 7, in the presence of about 5% of sodium sulfate (based on the weight of the material to be dyed), similarly valuable greenish yellow dyeings are obtained, the dyeing strength obtained in this procedure corresponding to those which are obtained under the alkaline fixing conditions for fiber-reactive dyes. Like in the customary dyeing method for fiber-reactive conditions, this dyeing method produces with the use of the disazo compound according to the invention cotton dyeings having good light fastness properties and good wash, perspiration, water, hot press, gas fume fading and sublimation fastness properties and a good resistance to acid fading.

for 30 minutes and is then brought to pH 5.5 in the course of 90 minutes, then slowly warmed to 40°–50° C. and subsequently stirred at that temperature for 3 hours while a pH value of 5 to 5.5 is maintained. Toward the end of the second condensation reaction, the pH value is brought to 7, and the reaction product dissolved.

The batch is cooled down to about 10° C., is mixed with 52.5 parts by volume of a 39% strength aqueous sodium nitrite solution and is diazotized in conventional manner by gradual addition to a mixture of 150 parts by volume of concentrated hydrochloric acid and 1000 parts of ice. This is followed by about 30 minutes of stirring and addition of 10% of sodium chloride, based on the volume of the diazonium salt suspension, subsequently stirring in the presence of a small excess of nitrite for a further 3 hours, and then destroying excess nitrite by means of amidosulfonic acid.

The coupling reaction is effected by adding a neutral aqueous solution of 127.6 parts of 3-methyl-1-(4'-β-sulfatoethylsulfonyl)-phenyl-5-pyrazolone at a pH value of 5 to 6. The resulting suspension of the disazo compound according to the invention has added to it, based on the volume of the synthesis batch, 15% of potassium chloride and is heated to 80° C.; the compound according to the invention is filtered off with suction at 60° to 70° C. and dried.

This gives an electrolyte-containing yellow powder of the alkali metal salt, in particular potassium salt, of the compound of the formula

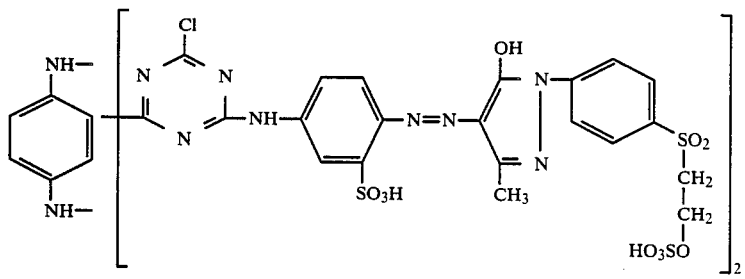

EXAMPLE 2

To 74 parts of cyanuric acid chloride in aqueous suspension is added with stirring at 0° to 5° C. a neutral solution of 75.3 parts of 1,4-diaminobenzene-3-sulfonic acid; the pH value is allowed to drop to less than 1, and the batch is subsequently stirred for 90 minutes at the pH value below 1 and at a temperature of 0° to 5° C. 21.6 parts of 1,4-diaminobenzene are then slowly added to the reaction mixture, which is subsequently stirred which, applied to cellulose fiber material, such as cotton, by the application and fixing conditions customary for fiber-reactive dyes but similarly also from an aqueous dye bath under the dyeing conditions for disperse dyes, for instance at a temperature between 100° and 130° C. and at a pH value between 5 and 7, strong golden yellow dyeings having good fastness properties, such as good light, wash, perspiration, water, hot press, gas fume fading and sublimation fastness properties and a good resistance of these dyeings to acid fading.

EXAMPLE 3

A neutral aqueous solution of 75.3 parts of 1,4-diaminobenzene-3-sulfonic acid is stirred into an aqueous suspension of 74 parts of cyanuric chloride, and the batch is subsequently stirred for about another 1.5 hours without addition of an acid-binding agent. Ice and 120 parts by volume of a concentrated aqueous hydrochloric acid are then added, which is followed by diazotization in conventional manner through addition of 53 parts by volume of 39% strength aqueous sodium nitrite solution. The diazonium compound is then coupled in conventional manner at a pH value between 5 and 6 to 3-(β-chloropropionylamino)-6-sulfo-8-naphthol (120 parts). The monoazo compound thus obtainable is salted out of the synthesis solution by means of sodium chloride at a pH value of 6, is filtered off and is dissolved again in 1500 parts of water at a pH value between 6 and 7. A solution of 21.6 parts of 1,4-diaminobenzene in 300 parts of water and 50 parts by volume of a concentrated aqueous hydrochloric acid is then continuously added in the course of an hour, and the batch is subsequently stirred at 30° to 40° C. for a further 2 hours, during which a pH value between 6 and 7 is gradually established by means of sodium carbonate. As soon as no more sodium carbonate is consumed, the batch is brought to pH 4, and the diazo compound according to the invention is isolated by salting out with sodium chloride.

The resulting novel sodium salt of the compound of the formula

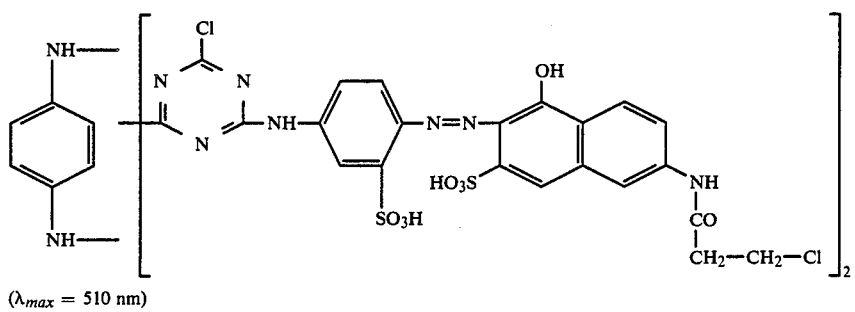

($\lambda_{max}$ = 510 nm)

has very good fiber-reactive dye properties and produces in particular on cellulose fiber materials using application and fixing methods customary for fiber-reactive dyes strong red dyeings and prints having good fastness properties, of which in particular the good light and wet fastness properties, such as the wash, perspiration and water fastness properties, have to be singled out. In addition, this disazo compound likewise produces strong red dyeings on cellulose fiber materials of the same high quality and high fastness level even on application from an aqueous dye bath at a temperature between 100° and 130° C. and at a pH value between 5 and 7.

EXAMPLE 4

A neutral solution of 80.4 parts of N,N'-di-(3-sulfo-4-aminophenyl)-urea in 5500 parts of water is added with thorough stirring to a mixture of 200 parts of water, 400 parts of ice, 74 parts of cyanuric chloride and 10 parts of a commercially available dispersant. This is followed by 2 hours of stirring and then addition, while stirring, of a neutral solution of 75.3 parts of 1,3-diaminobenzene-4-sulfonic acid in 400 parts of water, allowing the temperature to rise to 25° C. and heating further to 40° C. in the course of 1 hour, during which the pH is set to and maintained at a value of 5. This is followed by stirring at 40° C. for 1 hour, then again increasing the reaction temperature to 50° to 60° C. during a further hour while maintaining a pH value between 4 and 5, stirring until no more acid-binding agent (such as sodium bicarbonate) is consumed to maintain this pH range, cooling down and diazotizing the reaction mixture in conventional manner by means of 40 parts by volume of a 39% strength aqueous sodium nitrite solution and 90 parts by volume of aqueous concentrated hydrochloric acid. The batch is subsequently stirred at approximately 0° to 5° C. for a further 3 hours, and excess nitrite is removed. The coupling component used is 2-(4'-β-sulfatoethylsulfonylphenylazo)-3,6-disulfo-1-amino-8-naphthol. 183 parts of this monoazo compound are added to the suspension of the diazonium salt, and the coupling reaction is carried out at a pH value between 6 and 7 and at a temperature between 10° and 20° C.

The disazo compound according to the invention is salted out with potassium chloride and isolated to give a bluish black, electrolyte-containing powder of the alkali metal salt (predominantly potassium salt) of the compound of the formula

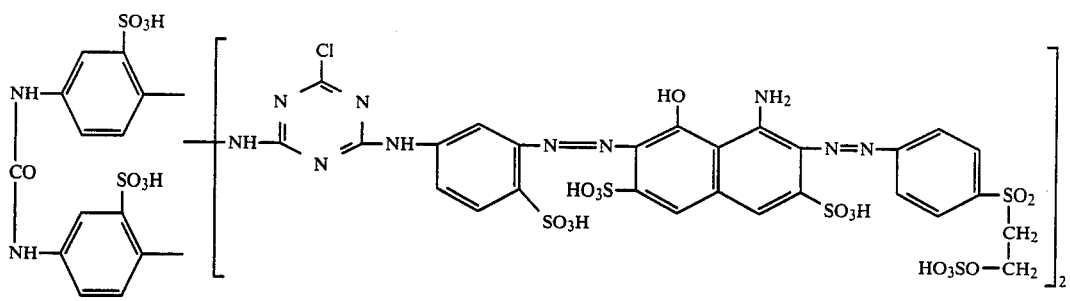

This compound according to the invention has very good fiber-reactive dyeing properties and applied by the alkaline fixing process for fiber-reactive dyes, for example from a long aqueous liquor at 60° to 80° C. in the presence of an alkali, produces on cellulose fiber materials strong navy dyeings having the good properties mentioned hereinafter. Similarly advantageously the compound according to the invention, if applied in the absence of alkali from an aqueous dye bath at a temperature between 120° and 130° C. and at a pH value between 5 and 7, dyes cellulose fiber materials in strong navy shades having good fastness properties, of which in particular the good light, wash, perspiration, water, hot press and gas fume fading fastness properties, and also the very high sublimation fastness of the azo compound according to the invention and furthermore the high acid fading resistance of these dyeings can be singled out.

EXAMPLE 5

The method of Example 4 is used to prepare the condensation product of the urea compound specified there, cyanuric chloride and 1,3-diaminobenzene-4-sulfonic acid and subsequently the diazonium salt thereof.

In a separate batch, the coupling component is synthesized by passing in 35 parts of diketene with thorough stirring at 0° to 5° C. into an aqueous solution of 97.5 parts of 4-(β-sulfatoethylsulfonyl)-2-methoxy-5-methylaniline, which has been brought with acetic acid to a pH value between 5 and 6.

The solution of the coupling component is added with thorough stirring to the diazonium salt suspension, a pH value between 4 and 5 is established, and after the coupling reaction has ended the compound according to the invention is isolated by spray-drying or by salting out with potassium chloride or sodium chloride.

The novel alkali metal salt of the compound of the formula has very good fiber-reactive dye properties and applied for example by the customary application and fixing methods in the presence of an alkali, for example from an aqueous dye bath at 60° to 80° C. and in the presence of an alkali, but similarly even in the absence of an alkali from an aqueous dyeing liquor at a pH value between 5 and 7 and at a temperature between 100° and 130° C., produces on cellulose fiber materials in particular strong greenish yellow dyeings having good fastness properties, of which in particular the good light and wet fastness properties, such as wash, perspiration and water fastness properties, have to be singled out.

EXAMPLES 6 TO 66

The tabulated Examples below describe further disazo compounds according to the invention conforming to the abovementioned general formula (1) by means of the components thereof. They can be prepared in a manner according to the invention, for example in accordance with one of the worked Examples above, and applied by the application and fixing methods customary for fiber-reactive dyes produce in particular on cellulose fiber materials such as cotton, strong dyeings to a high fastness level and prints having the hues indicated in the respective tabulated example. Dyeings on cellulose fiber materials having similarly good dyeing strengths and similarly good fastness properties are likewise obtained if the dyeing conditions for the dyeing of polyester fibers with disperse dyes, such as, for example, from an aqueous bath at a temperature between 100° and 130° C. and at a pH value between 5 and 7, in the absence or presence of an electrolyte salt, such as sodium sulfate or sodium chloride, are employed. The component (C) indicated in the tabulated Examples corresponds to the radical of the general formula (C) as in the starting diamino compound of the general formula (13):

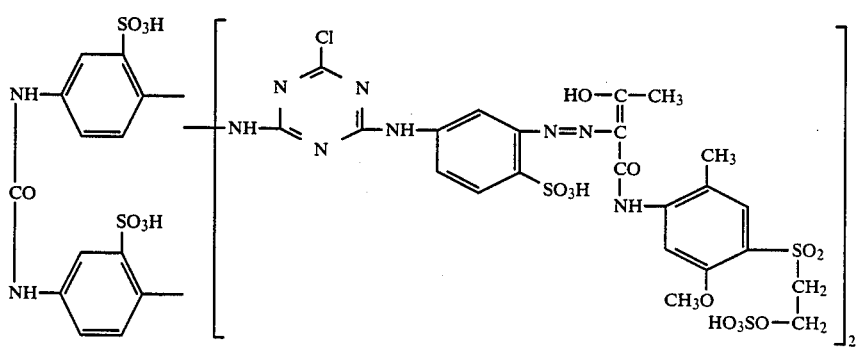

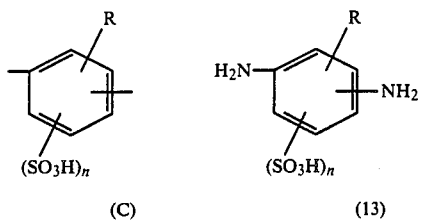

(C)        (13)

| | | Azo compounds of the general formula (1) with... | | |
|---|---|---|---|---|
| Example | Component A | B | Component (C) | Coupling component H—K | Hue on cotton |
| 6 | 2,2′disulfostilben-4,4′-ylene | Cl | (phenyl-SO₃H, para) | 1-(4′-β-sulfatoethylsulfonylphenyl)-3-carboxy-5-pyrazolone | greenish yellow |
| 7 | 2,2′disulfostilben-4,4′-ylene | Cl | (phenyl-SO₃H, para) | 1-(4′-vinylsulfonylphenyl)-3-methyl-5-pyrazolone | yellowish green |
| 8 | 2,2′disulfostilben-4,4′-ylene | Cl | (phenyl-SO₃H, para) | 1-(4′-vinylsulfonylphenyl)-3-methyl-5-pyrazolone | reddish yellow |
| 9 | 2,2′disulfostilben-4,4′-ylene | Cl | (phenyl-SO₃H, para) | 1-(4′-β-sulfatoethylsulfonylphenyl)-3-carboxy-5-pyrazolone | reddish yellow |
| 10 | 2,2′disulfostilben-4,4′-ylene | F | (phenyl-SO₃H, para) | 1-(4′-β-sulfatoethylsulfonylphenyl)-3-carboxy-5-pyrazolone | reddish yellow |
| 11 | 2,2′-disulfo-4,4′-diphenylene | Cl | (phenyl-SO₃H, para) | 1-(4′-β-sulfatoethylsulfonylphenyl)-3-carboxy-5-pyrazolone | reddish yellow |
| 12 | 2,2′-disulfo-4,4′-diphenylene | Cl | (phenyl-SO₃H, para) | 1-(4′-β-sulfatoethylsulfonylphenyl)-3-methyl-5-pyrazolone | reddish yellow |
| 13 | 2,2′-disulfo-4,4′-diphenylene | Cl | (phenyl-SO₃H, ortho) | 1-(4′-β-sulfatoethylsulfonylphenyl)-3-methyl-5-pyrazolone | greenish yellow |
| 14 | 3,3′-disulfo-4,4′-diphenylene | Cl | (phenyl-SO₃H, ortho) | 1-(4′-β-sulfatoethylsulfonylphenyl)-3-methyl-5-pyrazolone | greenish yellow |

-continued

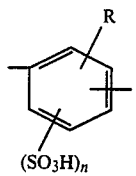
(C)

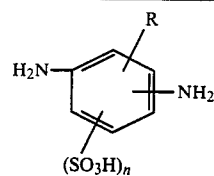
(13)

| Example | Component A | B | Component (C) | Coupling component H—K | Hue on cotton |
|---|---|---|---|---|---|
| 15 | 3,3'-disulfo-4,4'-diphenylene | Cl | (benzene with SO₃H) | 1-(4'-β-sulfatoethylsulfonylphenyl)-3-methyl-5-pyrazolone | reddish yellow |
| 16 | 1,4-phenylene | Cl | (benzene with SO₃H) | 1-(4'-β-sulfatoethylsulfonylphenyl)-3-methyl-5-pyrazolone | greenish yellow (417 nm) |
| 17 | 1,4-phenylene | F | (benzene with SO₃H) | 1-(4'-β-sulfatoethylsulfonylphenyl)-3-methyl-5-pyrazolone | greenish yellow |
| 18 | 1,4-phenylene | F | (benzene with SO₃H) | 1-(4'-β-sulfatoethylsulfonylphenyl)-3-carboxy-5-pyrazolone | reddish yellow |
| 19 | 1,4-phenylene | Cl | (benzene with HO₃S, SO₃H) | 1-(4'-vinylsulfonylphenyl)-5-pyrazolone | greenish yellow |
| 20 | 1,4-phenylene | Cl | (benzene with CH₃, SO₃H) | 1-(4'-vinylsulfonylphenyl)-5-pyrazolone | greenish yellow |
| 21 | 1,4-phenylene | Cl | (benzene with SO₃H, SO₃H) | 1-(4'-vinylsulfonylphenyl)-5-pyrazolone | greenish yellow |
| 22 | 1,4-phenylene | Cl | (benzene with CH₃, SO₃H) | 1-(4'-β-thiosulfatoethylsulfonylphenyl)-3-methyl-5-pyrazolone | reddish yellow |
| 23 | 1,4-phenylene | Cl | (benzene with CH₃O, SO₃H) | 1-(4'-β-thiosulfatoethylsulfonylphenyl)-3-methyl-5-pyrazolone | reddish yellow |
| 24 | 1,4-phenylene | Cl | (benzene with COOH) | 1-(4'-β-thiosulfatoethylsulfonylphenyl)-3-methyl-5-pyrazolone | greenish yellow |

-continued

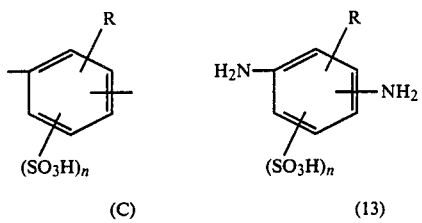

| | | | Azo compounds of the general formula (1) with... | |
|---|---|---|---|---|
| Example | Component A | B | Component (C) | Coupling component H—K | Hue on cotton |
| 25 | 2-sulfo-1,4-phenylene | Cl | ⟨phenyl-SO₃H⟩ | 1-(4'-β-thiosulfatoethyl-sulfonylphenyl)-3-methyl-5-pyrazolone | greenish yellow |
| 26 | 1,4-phenylene | Cl | ⟨phenyl-SO₃H⟩ | 1-(4'-β-sulfatoethyl-sulfonylphenyl)-3-carboxy-5-pyrazolone | greenish yellow |
| 27 | 1,4-phenylene | Cl | 1,4-phenylene | 1-(4'-β-sulfatoethyl-sulfonylphenyl)-3-carboxy-5-pyrazolone | reddish yellow |
| 28 | 2,5-disulfo-1,4-phenylene | Cl | 1,4-phenylene | 1-(4'-β-sulfatoethyl-sulfonylphenyl)-3-carboxy-5-pyrazolone | reddish yellow |
| 29 | 2,5-disulfo-1,4-phenylene | F | 1,4-phenylene | 1-(4'-β-sulfatoethyl-sulfonylphenyl)-3-carboxy-5-pyrazolone | reddish yellow |
| 30 | 2,5-disulfo-1,4-phenylene | F | ⟨phenyl-SO₃H⟩ | 1-(4'-β-sulfatoethyl-sulfonylphenyl)-3-carboxy-5-pyrazolone | greenish yellow |
| 31 | 2,5-disulfo-1,4-phenylene | Cl | ⟨phenyl-SO₃H⟩ | 1-(4'-β-sulfatoethyl-sulfonylphenyl)-3-methyl 5-pyrazolone | greenish yellow |
| 32 | 2,5-disulfo-1,4-phenylene | F | ⟨phenyl-SO₃H⟩ | 1-(4'-β-sulfatoethyl-sulfonylphenyl)-3-methyl 5-pyrazolone | greenish yellow |
| 33 | ⟨NH-phenyl(SO₃H)-CO-NH-phenyl(SO₃H)⟩ | Cl | ⟨phenyl-SO₃H⟩ | 1-(4'-β-sulfatoethyl-sulfonylphenyl)-3-methyl-5-pyrazolone | greenish yellow |

-continued

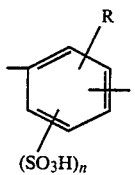
(C)

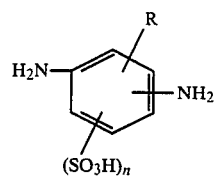
(13)

Azo compounds of the general formula (1) with...

| Example | Component A | B | Component (C) | Coupling component H—K | Hue on cotton |
|---|---|---|---|---|---|
| 34 | (two p-sulfophenyl groups linked by NH-CO-NH, each with SO₃H) | Cl | (phenyl with SO₃H) | 1-(4'-β-sulfatoethyl-sulfonylphenyl)-3-methyl-5-pyrazolone | reddish yellow |
| 35 | (two phenyl groups linked by NH-CO-NH, with SO₃H substituents) | F | (phenyl with SO₃H) | 1-(4'-β-sulfatoethyl-sulfonylphenyl)-3-methyl-5-pyrazolone | reddish yellow |
| 36 | (two phenyl groups linked by NH-CO-NH, with SO₃H substituents) | Cl | (phenyl with SO₃H) | 1-(4'-β-thiosulfatoethyl-sulfonylphenyl)-3-carboxy-5-pyrazolone | reddish yellow |
| 37 | (two phenyl groups linked by NH-CO-NH, with SO₃H substituents) | Cl | (phenyl with SO₃H) | 1-(4'-β-thiosulfatoethyl-sulfonylphenyl)-3-carboxy-5-pyrazolone | greenish yellow |

-continued

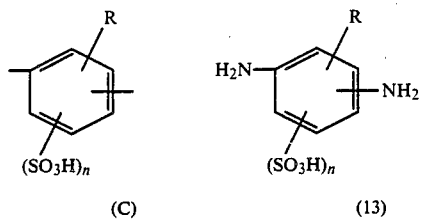

| Example | Component A | B | Component (C) | Coupling component H—K | Hue on cotton |
|---|---|---|---|---|---|
| 38 | (structure with two NH-CO linked phenyl-SO₃H groups) | Cl | phenyl-SO₃H | 1-(4'-β-sulfatoethylsulfonylphenyl)-3-carboxy-5-pyrazolone | greenish yellow |
| 39 | 1,4-phenylene | Cl | phenyl-SO₃H | 2-(β-chloropropionylamino)-6-sulfo-8-naphthol | bluish red |
| 40 | 1,4-phenylene | Cl | phenyl-SO₃H | 2-[4'-(4"-β-sulfatoethylsulfonylphenyl)-amino-2'-chloro-s-triazin-6'-yl]-amino-6-sulfo-8-naphthol | bluish red |
| " | 1,4-phenylene | Cl | phenyl-SO₃H | 3-[4'-(4"-β-sulfatoethylsulfonylphenyl)-amino-2'-chloro-s-triazin-6'-yl]-amino-6-sulfo-8-naphthol | reddish orange |
| 42 | 1,4-phenylene | Cl | phenyl-SO₃H | 3-[4'-(4"-β-sulfatoethylsulfonylphenyl)-amino-2'-chloro-s-triazin-6'-yl]-amino-6-sulfo-8-naphthol | bluish red |
| 43 | 1,4-phenylene | Cl | phenyl-SO₃H | 3-N—methyl-N—[4'-(3"-β-sulfatoethylsulfonylphenyl)-amino-2'-chloro-s-triazin-6'-yl]-amino-6-sulfo-8-naphthol | bluish red |
| 44 | (structure with two NH-CO linked phenyl-SO₃H groups) | Cl | phenyl-SO₃H | 2-(4'-β-sulfatoethylsulfonyl-2',5'-dimethoxyphenylazo)-3,6-disulfo 1-amino-8-naphthol | greenish navy |

-continued

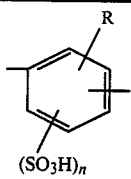
(C)

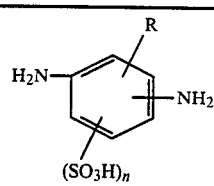
(13)

Azo compounds of the general formula (1) with...

| Example | Component A | B | Component (C) | Coupling component H—K | Hue on cotton |
|---|---|---|---|---|---|
| 45 | (two phenyl-NH groups linked by CO, each with SO₃H) | Cl | (phenyl with SO₃H) | 2-(4'-β-sulfatoethylsulfonyl-2',5'-dimethoxyphenylazo)-3,6-disulfo-1-amino-8-naphthol | greenish navy |
| 46 | 3,3'-disulfo-4,4'- | Cl | (phenyl with SO₃H) | 2-(4'-β-sulfatoethylsulfonylphenylazo)-4,6-disulfo-1-amino-8-naphthol | greenish navy |
| 47 | 3,3'-disulfo-4,4'- | Cl | (phenyl with SO₃H) | 2-(4'-β-sulfatoethylsulfonylphenylazo)-4,6-disulfo-1-amino-8-naphthol | reddish navy |
| 48 | (stilbene with two SO₃H) | Cl | (phenyl with SO₃H) | 2-(4'-β-sulfatoethylsulfonylphenylazo)-4,6-dosulfo-1-amino-8-naphthol | reddish navy |
| 49 | (stilbene with two SO₃H) | F | (phenyl with SO₃H) | 2-(4'-β-sulfatoethylsulfonylphenylazo)-4,6-dosulfo-1-amino-8-naphthol | reddish navy |
| 50 | (stilbene with two SO₃H) | Cl | (phenyl with SO₃H) | 2-(4'-vinylsulfonylphenylazo)-3,6-disulfo-1-amino-8-naphthol | reddish navy (608 nm) |

-continued

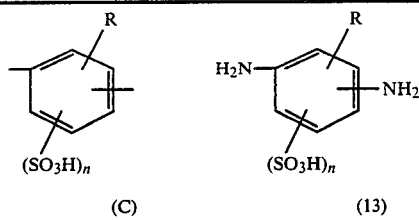

| | | Azo compounds of the general formula (1) with... | | |
|---|---|---|---|---|
| Example | Component A | B | Component (C) | Coupling component H—K | Hue on cotton |
| 51 | 1,4-phenylene | Cl | (phenyl-SO₃H) | 2-(4'-vinylsulfonyl-phenylazo)-3,6-disulfo-1-amino-8-naphthol | greenish navy (610 nm) |
| 52 | 2-sulfo-1,4-phenylene | Cl | (phenyl-SO₃H) | 2-(4'-vinylsulfonyl-phenylazo)-3,6-disulfo-1-amino-8-naphthol | reddish navy |
| 53 | stilbene-disulfo (HC=CH bridged bis-phenyl with SO₃H groups) | Cl | (phenyl-SO₃H) | N—(4-β-sulfatoethylsulfonyl-2-methoxy-5-methyl)-acetoacetylanilide | greenish yellow |
| 54 | 2,5-disulfo-1,4-phenylene | Cl | (phenyl-SO₃H) | N—(4-β-sulfatoethylsulfonyl-2-methoxy-5-methyl)-acetoacetylanilide | greenish yellow |
| 55 | 3,3'-disulfo-4,4'-diphenylene | Cl | (phenyl-SO₃H) | N—(4-β-sulfatoethylsulfonyl-2-methoxy-5-methyl)-acetoacetylanilide | greenish yellow |
| 56 | 2,2'-disulfo-4,4'-diphenylene | Cl | (phenyl-SO₃H) | N—(4-β-sulfatoethylsulfonyl-2-methoxy-5-methyl)-acetoacetylanilide | greenish yellow |
| 57 | 1,4-phenylene | Cl | 2,5-disulfo-1,4-phenylene | N—(4-β-sulfatoethylsulfonyl-2,5-dimethoxy)-acetoacetylanilide | yellow |
| 58 | 2,5-disulfo-1,4-phenylene | Cl | 2,5-disulfo-1,4-phenylene | 3-[4'-(4''-β-sulfatoethylsulfonylphenyl)-amino-2'-chloro-s-triazin-6'-yl]-amino-6-sulfo-8-naphthol | bluish red |
| 59 | 3,3'-disulfo-4,4'-diphenylene | Cl | 2,5-disulfo-1,4-phenylene | 3-[4'-(4''-β-sulfatoethylsulfonylphenyl)-amino-2'-chloro-s-triazin-6'-yl]-amino-6-sulfo-8-naphthol | bluish red |
| 60 | 2,2'-disulfo-4,4'-diphenylene | Cl | 2,5-disulfo-1,4-phenylene | 3-[4'-(4''-β-sulfatoethylsulfonylphenyl)-amino-2'-chloro-s-triazin-6'-yl]-amino-6-sulfo-8-naphthol | bluish red |
| 61 | 1,4-phenylene | Cl | (phenyl-SO₃H) | 1-(4'-β-sulfatoethylsulfonylphenyl)-3-methyl-5-5-pyrazolone | greenish yellow (395 nm) |

-continued

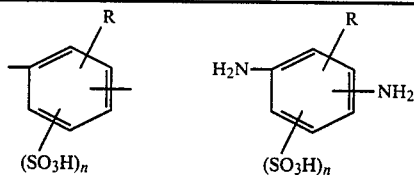

| Example | Component A | B | Component (C) | Coupling component H—K | Hue on cotton |
|---|---|---|---|---|---|
| | | | Azo compounds of the general formula (1) with... | | |
| 62 | 2,5-disulfo-1,4-phenylene | Cl | (benzene-SO$_3$H) | 1-(4'-β-sulfatoethylsulfonylphenyl)-3-methyl-5-5-pyrazolone | greenish yellow (350 nm) |
| 63 | 1,4-phenylene | Cl | (benzene-SO$_3$H) | 2-(4'-β-sulfatoethylsulfonylphenylazo)-3,6-disulfo-1-amino-8-naphthol | navy (612 nm) |
| 64 | 1,4-phenylene | Cl | (benzene-SO$_3$H) | 2-(4'-β-sulfatoethylsulfonylphenylazo)-3,6-disulfo-1-amino-8-naphthol | greenish blue (605 nm) |
| 65 | NH—(benzene-SO$_3$H)—CO—NH—(benzene-SO$_3$H) | Cl | (benzene-SO$_3$H) | 2-(4'-β-sulfatoethylsulfonylphenylazo)-3,6-disulfo-1-amino-8-naphthol | navy (604 nm) |
| 66 | 2,2'-disulfo-4,4'-diphenylene | Cl | (benzene-SO$_3$H) | 2-(4'-β-sulfatoethylsulfonylphenylazo)-3,6-disulfo-1-amino-8-naphthol | navy (610 nm) |

Dyeing Example 1

50 parts of a cotton fabric are introduced into a dye bath composed of 1 part of the disazo compound according to the invention of Example 1 (in the form of a neutral salt), 50 parts of anhydrous sodium sulfate, 800 parts of water and 200 parts of an aqueous buffer solution prepared from 200 parts of water and 20 parts of 85% strength phosphoric acid and brought to pH6 with sodium hydroxide solution. The fabric is treated in the bath at a temperature of 130° C. for 90 minutes with constant agitation. The dyeing obtained is then aftertreated by rinsing with warm and with hot water, by washing in an aqueous bath composed of 1500 parts of water and 1.5 parts of nonionic agent at the boil for 15 minutes, and by renewed rinsing with warm water, and is dried.

This gives a deep greenish yellow dyeing having the fastness properties mentioned in Example 1 and a good crock fastness. Furthermore, the dyeing according to the invention exhibits good color buildup in this dyeing process.

If this dyeing process is carried out not at a pH value of 6 but at a pH value of 5, or 7 or 8, this gives equally good greenish yellow dyeings having virtually the same dyeing strength as the dyeing prepared at pH 6.

Dyeing Example 2

If the disazo compound of Example 1 is used for dyeing cellulose fiber materials, such as cotton fabric, in a dyeing process customary for fiber-reactive dyes, as for example in an exhaust dyeing process at a temperature of 60° C. or 80° C. in the presence of an alkaline agent, such as sodium carbonate and sodium hydroxide solution, and of an electrolyte salt, such as sodium sulfate, this likewise gives very strong greenish yellow dyeings having the good fastness properties mentioned.

Dyeing Example 3

100 parts of a blend fabric composed of equal portions of polyester and cellulose fibers is dyed at 130° C. for 90 minutes in 2000 parts of a neutral aqueous bath containing 2 parts of commercial grade C.I. Disperse Red 73 (Colour Index No. 11,116) and 2 parts of the disazo dye according to the invention of Example 39 by the conventional dyeing method for polyester fibers. The result obtained is a fabric which has been dyed level and deep in an even bluish red shade.

If the dyeing is carried out only with the disperse dye, only the polyester weft threads are dyed, producing on the fabric a pale red color which lacks solidity.

A similar impression is created by the dyed fabric which is obtained in the same procedure when only the disazo compound according to the invention is used in the dye bath, since in this case only the cellulose fiber warp threads are dyed.

We claim:

1. A water-soluble compound of the formula

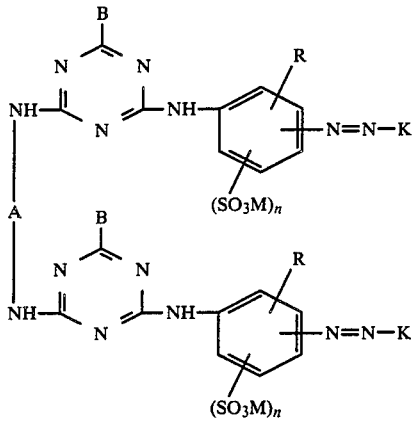

in which:

A is alkylene of 2 to 6 carbon atoms or phenylene unsubstituted or substituted by 1 or 2 substituents, or is a group of the formula

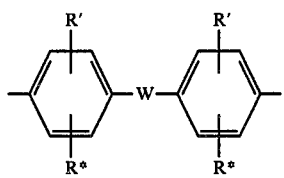

in which

W is a direct bond or a bridge member and and R' and R* each are, independently on each other, hydrogen, chlorine, methyl, methoxy, ethoxy, carboxy or sulfo;

B is chlorine or fluorine;

R is hydrogen, chlorine, alkyl of 1 to 4 carbon atoms or alkoxy of 1 to 4 carbon atoms;

M is hydrogen or an alkali metal;

n is the number zero, 1 or 2 (where in the case of n=0 this group denotes a hydrogen atom);

K is a group of the formula

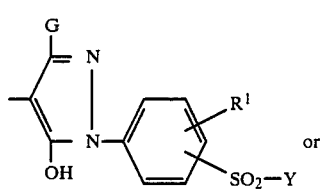

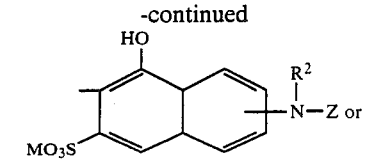

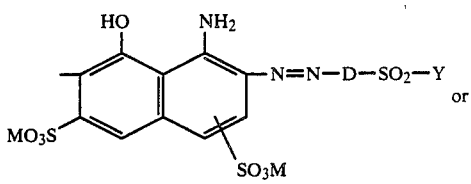

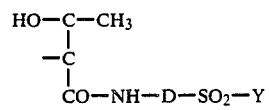

in which

D is phenylene unsubstituted or substituted by 1 or 2 substituents selected from the group consisting of chlorine, bromine, alkyl of 1 to 4 carbon atoms, alkoxy of 1 to 4 carbon atoms, carboxy and sulfo, or is naphthylene unsubstituted or substituted by 1 or 2 sulfo groups, $R^1$ is hydrogen, chlorine, alkyl of 1 to 4 carbon atoms or alkoxy group of 1 to 4 carbon atoms, $R^2$ is hydrogen or alkyl of 1 to 4 carbon atoms, G is carboxy, methyl or carbalkoxy of 2 to 5 carbon atoms, Y is vinyl, β-sulfatoethyl, β-phosphatoethyl, β-thiosulfatoethyl or β-chloroethyl, M has the abovementioned meaning and Z is α- or β-bromoacryloyl or β-chloropropionyl or a group of the formula

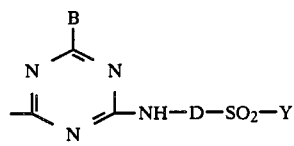

in which B, D and Y are defined as above.

2. A compound as claimed in claim 1, wherein the formula members which appear twice have in each case the same meaning.

3. A compound as claimed in claim 1, wherein each B is chlorine.

4. A compound as claimed in claim 1, in which

A is alkylene of 2 to 6 carbon atoms, or phenylene unsubstituted or substituted by 1 or 2 substituents selected from the group consisting of alkoxy of 1 to 4 carbon atoms, alkyl of 1 to 4 carbon atoms, chlorine, sulfo and carboxy, or A is a group of the formula

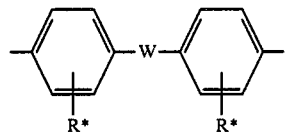

in which W is a direct bond or a bridge member selected from the group consisting of the formulae —CH$_2$—, —CH$_2$—CH$_2$—, —O—CH$_2$—CH$_2$—O—, —CH=CH—, —N=N—, —NH—CO—NH—, or —CO—NH—, and the R*, identical to or different from each other, each are hydrogen, chlorine, methyl, methoxy, ethoxy, carboxy or sulfo, and B is chlorine.

5. A compound as claimed in claim 1, wherein Y in the formula member K is vinyl or β-sulfatoethyl.

6. A compound as claimed in claim 1, wherein D in the formula member K is phenylene unsubstituted or substituted by 1 or 2 substituents selected from the group consisting of chlorine, bromine, alkyl of 1 to 4 carbon atoms, alkoxy of 1 to 4 carbon atoms, carboxy and sulfo.

7. A compound as claimed in claim 1, wherein R is hydrogen.

8. A compound as claimed in claim 5, wherein R is hydrogen.

9. A compound as claimed in claim 6, wherein R is hydrogen.

10. A compound as claimed in claim 1, wherein K is a group of the formula

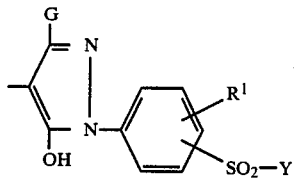

in which G is methyl or carboxy, R$^1$ is hydrogen, chlorine, alkyl of 1 to 4 carbon atoms or alkoxy of 1 to 4 carbon atoms and Y is defined as in claim 1.

11. A compound as claimed in claim 1, wherein K is a group of the formula

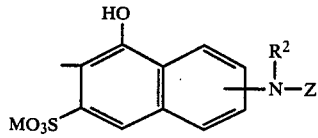

in which M is hydrogen or an alkali metal, R$^2$ is hydrogen or alkyl of 1 to 4 carbon atoms and Z is β-chloropropionyl or a group of the formula

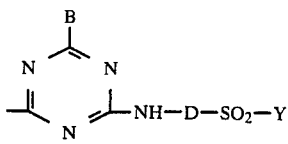

in which B is chlorine or fluorine, Y is defined as in claim 1 and D is phenylene unsubstituted or substituted by 1 or 2 substituents selected from the group consisting of chlorine, bromine, alkyl of 1 to 4 carbon atoms, alkoxy of 1 to 4 carbon atoms, carboxy and sulfo.

12. A compound according to claim 1, wherein D is an unsubstituted phenylene.

13. A compound as claimed in claim 1 wherein K is a group of the formula

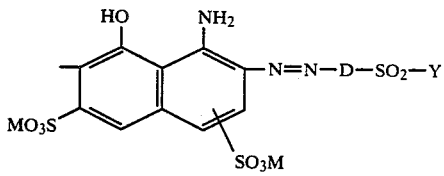

in which M is hydrogen or an alkali metal, D is phenylene unsubstituted or substituted by 1 or 2 substituents selected from the group consisting of chlorine, bromine, alkyl of 1 to 4 carbon atoms, alkoxy of 1 to 4 carbon atoms, carboxy and sulfo and Y has the meaning mentioned in claim 1.

14. A compound according to claim 13, wherein D is an unsubstituted phenylene.

15. A compound as claimed in claim 1, wherein D is phenylene.

16. A compound as claimed in claim 1, wherein W is a direct bond or is a group of the formula —CH=CH— or —NH—CO—NH—.

17. A compound as claimed in claim 4, wherein W is a direct bond or is a group of the formula —CH=CH— or —NH—CO—NH—.

* * * * *

UNITED STATES PATENT AND TRADEMARK OFFICE
CERTIFICATE OF CORRECTION

PATENT NO. : 4,762,916
DATED : August 9, 1988
INVENTOR(S) : Ludwig Schlafer et al Page 1 of 2

It is certified that error appears in the above-identified patent and that said Letters Patent is hereby corrected as shown below:

In column 32, the first formula, please delete

" 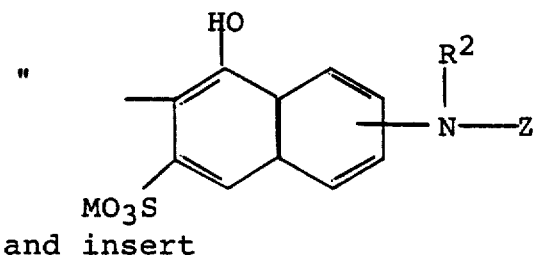

and insert

-- 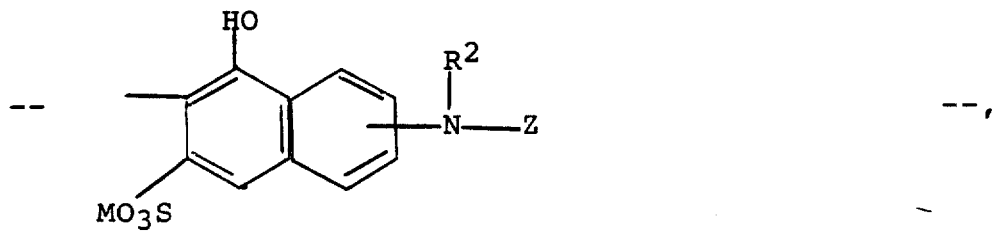 --,

UNITED STATES PATENT AND TRADEMARK OFFICE
CERTIFICATE OF CORRECTION

PATENT NO. : 4,762,916
DATED : August 9, 1988
INVENTOR(S) : Ludwig Schlafer et al Page 2 of 2

It is certified that error appears in the above-identified patent and that said Letters Patent is hereby corrected as shown below:

also in column 32, the third formula does not contain the double-bond, please insert -- 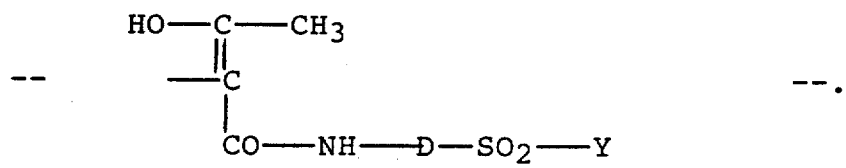 --.

Signed and Sealed this

Twenty-eighth Day of March, 1989

Attest:

DONALD J. QUIGG

Attesting Officer

Commissioner of Patents and Trademarks